United States Patent
Denton et al.

(10) Patent No.: US 9,714,457 B2
(45) Date of Patent: Jul. 25, 2017

(54) SUBMERSIBLE FILTERS FOR USE IN SEPARATING RADIOACTIVE ISOTOPES FROM RADIOACTIVE WASTE MATERIALS

(71) Applicant: Kurion, Inc., Oak Ridge, TN (US)

(72) Inventors: Mark S. Denton, Knoxville, TN (US); Joshua Mertz, West Richland, WA (US); Trevor Zimmerman, Boulder, CO (US)

(73) Assignee: KURION, INC., Irvine, CA (US)

( * ) Notice: Subject to any disclaimer, the term of this patent is extended or adjusted under 35 U.S.C. 154(b) by 376 days.

(21) Appl. No.: 13/850,890

(22) Filed: Mar. 26, 2013

(65) Prior Publication Data

US 2013/0264273 A1 Oct. 10, 2013

Related U.S. Application Data

(60) Provisional application No. 61/615,516, filed on Mar. 26, 2012.

(51) Int. Cl.
*B01D 39/16* (2006.01)
*C22B 3/42* (2006.01)
(Continued)

(52) U.S. Cl.
CPC ............ *C22B 3/42* (2013.01); *B01D 39/1623* (2013.01); *B01D 59/30* (2013.01); *B01J 39/04* (2013.01);
(Continued)

(58) Field of Classification Search
CPC ....... B01D 39/1623; G21F 9/04; G21F 9/305; C22B 23/0461; C22B 26/20
(Continued)

(56) References Cited

U.S. PATENT DOCUMENTS

| | | |
|---|---|---|
| 3,340,200 A | 9/1967 | Noble |
| 3,407,571 A | 10/1968 | Sherwood |

(Continued)

FOREIGN PATENT DOCUMENTS

| | | |
|---|---|---|
| EP | 173484 | 3/1986 |
| EP | 111839 | 6/1987 |

(Continued)

OTHER PUBLICATIONS

King, L. & Opelka, J., Three Mile Iland Cleanup: Experiences, Waste Disposal, and Environmental Impact, vol. 78, 1982, American Inst of Chemical Engineers, NY; 48 pages.

(Continued)

*Primary Examiner* — Madeline Gonzalez
(74) *Attorney, Agent, or Firm* — Schwabe Williamson & Wyatt

(57) ABSTRACT

Submersible media filters and submersible columns for use in removing radioactive isotopes and other contaminants from a fluid stream, such as a fluid stream from the primary coolant loop of a nuclear reactor system or a fluid stream from a spent-fuel pool. Generally, these submersible media filters and submersible columns are adapted to be submersed in the fluid stream, and additionally the filters are adapted to be vitrified after use, resulting in a stabilized, non-leaching final waste product with a substantially reduced volume compared to the original filter. In several embodiments, the submersible media filters and submersible columns include isotope-specific media (ISM).

20 Claims, 6 Drawing Sheets

(51) Int. Cl.
*C02F 1/42* (2006.01)
*G21F 9/00* (2006.01)
*B01D 59/30* (2006.01)
*C22B 3/00* (2006.01)
*C22B 26/20* (2006.01)
*G21F 9/04* (2006.01)
*B01J 39/04* (2017.01)
*B01J 39/18* (2017.01)
*C22B 7/00* (2006.01)
*C22B 26/10* (2006.01)
*B01J 49/60* (2017.01)
*G21F 9/30* (2006.01)
*C02F 101/00* (2006.01)
*C02F 103/34* (2006.01)

(52) U.S. Cl.
CPC ............... *B01J 39/18* (2013.01); *B01J 49/60* (2017.01); *C02F 1/42* (2013.01); *C22B 7/006* (2013.01); *C22B 23/0461* (2013.01); *C22B 26/10* (2013.01); *C22B 26/20* (2013.01); *G21F 9/007* (2013.01); *G21F 9/04* (2013.01); *B01D 2259/40083* (2013.01); *C02F 2101/006* (2013.01); *C02F 2103/34* (2013.01); *G21F 9/305* (2013.01)

(58) Field of Classification Search
USPC ............... 210/335, 489, 337, 338, 314, 315, 210/321.86, 493.1, 485, 498, 499, 503, 210/500.26, 483, 484, 487, 488
See application file for complete search history.

(56) References Cited

U.S. PATENT DOCUMENTS

| | | | |
|---|---|---|---|
| 4,190,515 A | 2/1980 | Butler | |
| 4,280,984 A | 7/1981 | Miyake et al. | |
| 4,389,253 A | 6/1983 | Nishimura | |
| 4,469,628 A | 9/1984 | Simmons | |
| 4,494,965 A | 1/1985 | Ali-Khan | |
| 4,585,583 A | 4/1986 | Roberson et al. | |
| 4,773,997 A * | 9/1988 | Butte | 210/282 |
| 5,089,217 A | 2/1992 | Corpora et al. | |
| 5,250,187 A | 10/1993 | Franks | |
| 5,645,518 A | 7/1997 | Wagh | |
| 5,885,925 A | 3/1999 | DeFilippi et al. | |
| 5,960,368 A | 9/1999 | Pierce et al. | |
| 6,013,180 A * | 1/2000 | Wang | C02F 1/003 210/232 |
| 6,109,349 A | 8/2000 | Simone et al. | |
| 6,143,106 A | 11/2000 | Shane | |
| 6,159,437 A | 12/2000 | Itoi et al. | |
| 6,332,914 B1 | 12/2001 | Lee | |
| 6,348,153 B1 | 2/2002 | Patterson | |
| 6,459,010 B1 | 10/2002 | Carpena | |
| 6,485,404 B1 | 11/2002 | Powell et al. | |
| 6,986,842 B2 * | 1/2006 | Bortnik et al. | 210/232 |
| 7,115,542 B2 | 10/2006 | Tranter et al. | |
| 7,390,934 B1 | 6/2008 | Kimura | |
| 2002/0141916 A1 | 10/2002 | Graham | |
| 2003/0213750 A1 * | 11/2003 | Koslow | 210/660 |
| 2004/0081604 A1 | 4/2004 | Lemaire | |
| 2004/0138514 A1 | 7/2004 | Tranter et al. | |
| 2007/0297858 A1 | 12/2007 | Imbrie | |
| 2010/0020915 A1 | 1/2010 | Beets et al. | |
| 2011/0077144 A1 | 3/2011 | Jessen | |
| 2011/0224472 A1 | 9/2011 | Denton | |
| 2011/0224473 A1 | 9/2011 | Denton | |
| 2011/0224474 A1 | 9/2011 | Denton | |
| 2011/0243834 A1 | 10/2011 | Denton | |
| 2013/0336870 A1 | 12/2013 | Denton | |

FOREIGN PATENT DOCUMENTS

| | | |
|---|---|---|
| EP | 243557 | 11/1987 |
| EP | 2831889 | 2/2015 |
| JP | 50-127100 | 9/1975 |
| JP | 56-137299 | 10/1981 |
| JP | 57-042508 | 3/1982 |
| JP | 62-011510 | 1/1987 |
| JP | 64-091096 | 4/1989 |
| JP | 05-066295 | 3/1993 |
| JP | 08-105998 | 4/1996 |
| JP | 11-193293 | 7/1999 |
| JP | H11193293 | 7/1999 |
| JP | 2000-506827 | 6/2000 |
| JP | 2002-267795 | 9/2002 |
| JP | 2005-500158 | 1/2005 |
| JP | 2005-091116 | 4/2005 |
| JP | 2011/152909 | 8/2011 |
| JP | 2015-503469 | 2/2015 |
| JP | 2015-503469 A | 2/2015 |
| WO | 99/62828 | 12/1999 |
| WO | WO 01/44115 | 6/2001 |
| WO | 01/95342 | 12/2001 |
| WO | 03/073011 | 9/2003 |
| WO | 03-073011 A2 | 9/2003 |
| WO | 2009/045230 | 4/2009 |
| WO | 2009/051878 | 4/2009 |
| WO | 2013/191780 | 12/2013 |
| WO | 2013/191781 | 12/2013 |
| WO | 2013/191781 A2 | 12/2013 |
| WO | 2014/172360 A2 | 10/2014 |

OTHER PUBLICATIONS

Hujie et al., "Zeolite Adsorption to Simulated Radioactive Nuclein", Journal of Southwest University of Scient and Technology, vol. 21., No. 3, pp. 1-4 and 18, Sep. 2006.

Huanyan et al., "Adsorption fo Aqueous Cadmium on Carbonate Hydroxyapatite", J. Mineral Petrol, vol. 24, No. 1, pp. 108-112, Apr. 2004.

Iaea, "Management of Waste Containing Tritium and carbon-14" http://www-pub.iaea.org/MTCD/publications/PDF/TRS421_web.pdf, Jun. 1996 on Jul. 2011.

Drake, Robert H., "Recovery of Tritium from Tritiated Water Cost-Effectiveness Analysis" Jun. 1996, http://www.fas.org/spg/othergov/doe/lan/llb-www/la-pubs/000326809.pdf.

Huang et al., Hydrophobic platinum-polytetrafluoroethylene catalyst for hydrogen isotope separation, International Journal of Hydrogen Energy, 2010, vol. 35, pp. 6108-6112. Abstract: Fig. 4; Fig 5.

Iaea, "Application of Ion Exchange Processes for the Treatment of Radioactive Waste and Management of Spent Ion Exchangers", Technical Reports Series No. 408, pp. 1-124, Feb. 2002, http://www-pub.iaea.org/MTCD/publications/PDF/TRS408_scr.pdf, Feb. 2002.

* cited by examiner

SUBMERSIBLE FILTERS FOR USE IN SEPARATING RADIOACTIVE ISOTOPES FROM RADIOACTIVE WASTE MATERIALS

CROSS-REFERENCE TO RELATED APPLICATIONS

This Application claims the benefit under 35 U.S.C. §119(e) of U.S. Provisional Patent Application Ser. No. 61/615,516, filed Mar. 26, 2012.

STATEMENT REGARDING FEDERALLY-SPONSORED RESEARCH OR DEVELOPMENT

Not Applicable

BACKGROUND OF THE INVENTION

1. Field of Invention

The present invention relates generally to the treatment of radioactive waste and in particular to processing waste water from nuclear power reactors and other sources of radioactive waste materials.

2. Description of the Related Art

The capability to isolate and manage specific radioactive isotopes is necessary for clean, safe, and secure radioactive waste management, which in turn is essential for the safe and cost-effective use of nuclear power. In nuclear power plants, radioactive isotopes leak into the primary and secondary water loops of light water nuclear reactors; this leakage is an unavoidable result of the decay of nuclear fuel as well as the nuclear activation (through exposure to radiation from the reactor core) of reactor components.

The concentration of particular radioactive isotopes in waste materials generally determines the waste classification of the waste material (for example, Class A, Class B, and Class C in the United States; or low, intermediate, or high level waste [LLW, ILW, or HLW] in other countries). The waste classification of waste material in turn delineates the storage and disposal requirements for that waste material. As a rule, waste material that receives a higher classification (such as Class B or Class C) faces stricter storage and disposal requirements, is more costly to manage, and can be legally stored in fewer locations. Therefore, it is desirable to limit the volume and amount of waste material that receives a higher classification by separating or removing from that waste material those specific radioactive isotopes that drive waste classification. In this regard, particularly desirable are systems, methods and processes for the separation of Cs-137, Sr-90, Ni-63, Tc-99, Am-241, Co-58, Co-60, and several isotopes of Uranium, for example. It would also be advantageous for the isotope-separation technology to also facilitate and work with technology for the processing of those specific radioactive isotopes for long-term storage or disposal, as for example through solidification or vitrification.

U.S. patent application Ser. No. 12/371,201, by the same inventor as the present general inventive concept, discloses isotope-specific media (ISM) to separate specific radioactive isotopes from radioactive waste materials.

Processed waste water must be substantially free of radioactive contaminants if it is to be released into the environment. The radioactive material extracted from the waste water during processing must be stable or in a form that can be stabilized for disposal in a way that meets disposal site requirements, particularly with respect to preventing the leaching out of radioactive contaminates by liquid water. Additionally, the volume of the waste must be minimized because of both the limited space available for disposal of radioactive waste and the high cost of its disposal. Accordingly there is a need for better ways of processing radioactive waste water containing suspended solids and dissolved ions from nuclear power reactors and other sources.

BRIEF SUMMARY OF THE INVENTION

Disclosed herein are submersible media filters and submersible columns for use in removing radioactive isotopes and other contaminants from a fluid stream, such as a fluid stream from the primary coolant loop of a nuclear reactor system or a fluid stream from a spent-fuel pool. Generally, these submersible media filters and submersible columns are adapted to be submersed in the fluid stream, and additionally in many embodiments the submersible media filters or submersible columns are adapted to be vitrified after use, resulting in a stabilized, non-leaching final waste product with a substantially reduced volume compared to the original media. In several embodiments, the submersible media filters and submersible columns include isotope-specific media (ISM). In some embodiments, a submersible filter according to the present general inventive concept comprises a pleated cartridge inside a cartridge type housing to sit in or intercept the fluid stream. Generally, the pleated cartridge comprises one or more kinds of filter material, and generally the filter material is itself pleated.

In some embodiments of the present general inventive concept, a submersible media filter (SMF) unit includes an inner mesh screen and an outer mesh screen. Between the inner mesh screen and the outer mesh screen are a pleated outer filter member and a non-pleated inner filter member. The pleated outer filter member and the non-pleated inner filter member define an interstitial volume that is filled with media to filter radioactive isotopes from water passed through the SMF unit. Generally, the SMF unit sits within a filtration vessel. A water feed tube delivers water containing radioactive isotopes to the filtration vessel, and outlet lines and carry water away from the filtration vessel. The water feed tube directs water containing radioactive isotopes into the interior of the SMF unit—that is, into the volume surrounded by the inner mesh screen. Pressure forces the water containing radioactive isotopes through the apertures in the inner mesh screen and through the unpleated inner filter member. Once through the unpleated inner filter member, the water containing radioactive isotopes encounters the media that fills the interstitial space between the pleated outer filter member and the unpleated inner filter member. The media remove selected radioactive isotopes from the water, and the water then passes through the pleated outer filter member and apertures in the outer mesh screen into a post-filtration surrounding volume within the filtration vessel. From there, the water passes the outlet lines and to leave the filtration vessel. The selected radioactive isotopes remain on the media within the SMF unit.

In some embodiments of the present general inventive concept, a submersible media filter to remove selected radioactive isotopes from liquid waste materials includes an inner filter member and an outer filter member, said outer filter member being pleated, said inner filter member and an outer filter member defining an interstitial volume to hold media to remove selected radioactive isotopes from liquid waste materials passed through said media and an inner mesh screen and an outer mesh screen, said inner mesh screen and said outer mesh screen to hold said inner filter member, said media, and said outer filter member between said inner mesh screen and said outer mesh screen.

In some embodiments, the media comprise a granular material.

In some embodiments, the media include glass-based microspheres.

In some embodiments, the media include Herschelite or hydroxyapatite.

In some embodiments, a submersible media filter further includes glass-forming materials to assist in vitrification of the media.

In some embodiments, the media include isotope-specific media.

In some embodiments of the present general inventive concept, a submersible column to remove selected radioactive isotopes from liquid waste materials includes a casing to hold a column of media to remove selected radioactive isotopes from liquid waste materials passed through said media, and a protective mesh screen to surround said casing and said column of media.

In some embodiments, the media include isotope-specific media.

In some embodiments, the protective mesh screen includes stainless steel.

In some embodiments, the media include a granular material.

In some embodiments, the media include glass-based microspheres, Herschelite, or hydroxylapatite.

In some embodiments, the media and the casing are disposable.

In some embodiments, the submersible column further includes glass-forming materials to assist in vitrification of said media and said casing.

In some embodiments, the ISM comprise a surfactant-modified Herschelite. In some embodiments, the ISM comprise fine or granular ISM.

Some example embodiments of the present general inventive concept generally include a filter for removing selected radioactive isotopes from liquid waste materials, with the filter comprising: a filter housing defining an interior; a porous glass screen to receive liquid waste materials containing selected radioactive isotopes, said porous glass screen giving the liquid waste materials access to the interior of said filter housing; and filter elements positioned within the interior of said filter housing, said filter elements to intercept liquid waste materials entering said filter housing through said porous glass screen, said filter elements including isotope-specific media to capture and retain selected radioactive isotopes from liquid waste materials. In some embodiments, said filter elements contain or are impregnated with isotope-specific media. In some embodiments, said filter elements comprise spun glass. In some embodiments, said filter elements comprise spun glass with isotope-specific media. In some embodiments, said filter elements comprise angel-hair glass. In some embodiments, said filter elements comprise angel-hair glass with isotope-specific media. In some embodiments, the filter elements include glass-forming materials to assist in vitrification of said filter elements and said isotope-specific media. In some embodiments, the isotope-specific media comprise glass-based microspheres. In some embodiments, the isotope-specific media include Herschelite or modified Herschelite. In some embodiments, the isotope-specific media include hydroxyapatite.

Some example embodiments of the present general inventive concept generally include a filter for removing selected radioactive isotopes from liquid waste materials, the filter generally comprising filter elements to intercept liquid waste materials, said filter elements being fabricated from fiber, spun glass, or other vitrifiable material, said filter elements containing isotope-specific media to capture and retain selected radioactive isotopes from liquid waste materials.

Some example embodiments of the present general inventive concept generally include a method for separating specified radioactive isotopes from liquid radioactive waste in a liquid stream and stabilizing the separated specified radioactive isotopes, comprising: passing the liquid radioactive waste with specified radioactive isotopes through a filter in the liquid stream, said filter including filter materials with isotope-specific media for capturing specified radioactive isotopes from the liquid waste; and stabilizing the filter and captured radioactive isotopes for further disposition. Some embodiments also comprise stabilizing the captured radioactive isotopes by vitrifying the captured radioactive isotopes. Some embodiments also comprise vitrifying the captured radioactive isotopes with the filter and isotope-specific media. Some embodiments also comprise, after passing the liquid waste through a filter, recycling the liquid waste to the nuclear reactor. In some embodiments, said filter elements comprise angel-hair glass. In some embodiments, said filter elements comprise angel-hair glass with isotope-specific media. In some embodiments, the filter elements include glass-forming materials to assist in vitrification of said filter elements and said isotope-specific media. In some embodiments, the isotope-specific media comprise glass-based microspheres. In some embodiments, the isotope-specific media include Herschelite or modified Herschelite. In some embodiments, the isotope-specific media include hydroxyapatite.

The present general inventive concept, as described herein through some example embodiments, comprises systems, processes and methods for the separation, isolation, or removal (collectively "separation") of radioactive isotopes from substantially liquid radioactive waste materials. In many embodiments, the separation of specific radioactive isotopes from radioactive waste materials removes from a substantial portion-by-volume of the radioactive waste materials isotopes that drive the classification of radioactive waste materials. In some embodiments, the use of ISM to separate specific radioactive isotopes from radioactive waste materials results in a substantial reduction of volume of higher-classified radioactive waste material for final disposal.

One aim of the present invention is to direct the isotopes that drive waste-classification, especially Cesium-137, Nickel-63, and Strontium-90, into very small packages for on-site storage, enhancing the volume of lower-classification waste for disposal off-site.

Some embodiments of the present general inventive concept further include the vitrification of the separated isotopes, generally with the isotope-specific media; this isotope-specific vitrification is often a step in a larger scheme of preparing the radioactive isotopes for long-term storage or other disposition.

BRIEF DESCRIPTION OF THE DRAWINGS

The above-mentioned and additional features of the invention will become more clearly understood from the following detailed description of the invention read together with the drawings in which.

DETAILED DESCRIPTION OF THE INVENTION

Disclosed herein are submersible media filters and submersible columns for use in removing radioactive isotopes (hereinafter "target isotopes") and other contaminants from a fluid stream, such as a fluid stream from the primary coolant loop of a nuclear reactor system or a fluid stream from a spent-fuel pool. Generally, these submersible media filters and submersible columns are adapted to be submersed in the fluid stream, and additionally in many embodiments the submersible media filters or submersible columns are adapted to be vitrified after use, resulting in a stabilized, non-leaching final waste product with a substantially reduced volume compared to the original media. In several embodiments, the submersible media filters and submersible columns include isotope-specific media (ISM).

Some example embodiments of the present general inventive concept employ isotope-specific media (ISM) to separate specific radioactive isotopes from radioactive waste materials. In some embodiments, ISM are positioned inside the pleats of the filter material. In some embodiments, the filter material is impregnated with ISM. In some embodiments, the ISM comprise a modified Herschelite. In some embodiments, the ISM comprise fine or granular ISM.

In some embodiments, a submersible filter according to the present general inventive concept comprises filter material that is vitirifiable. In some embodiments, the filter material comprises angel-hair glass. In some embodiments, the filter material comprises fabric-like spun glass.

Figure 1:
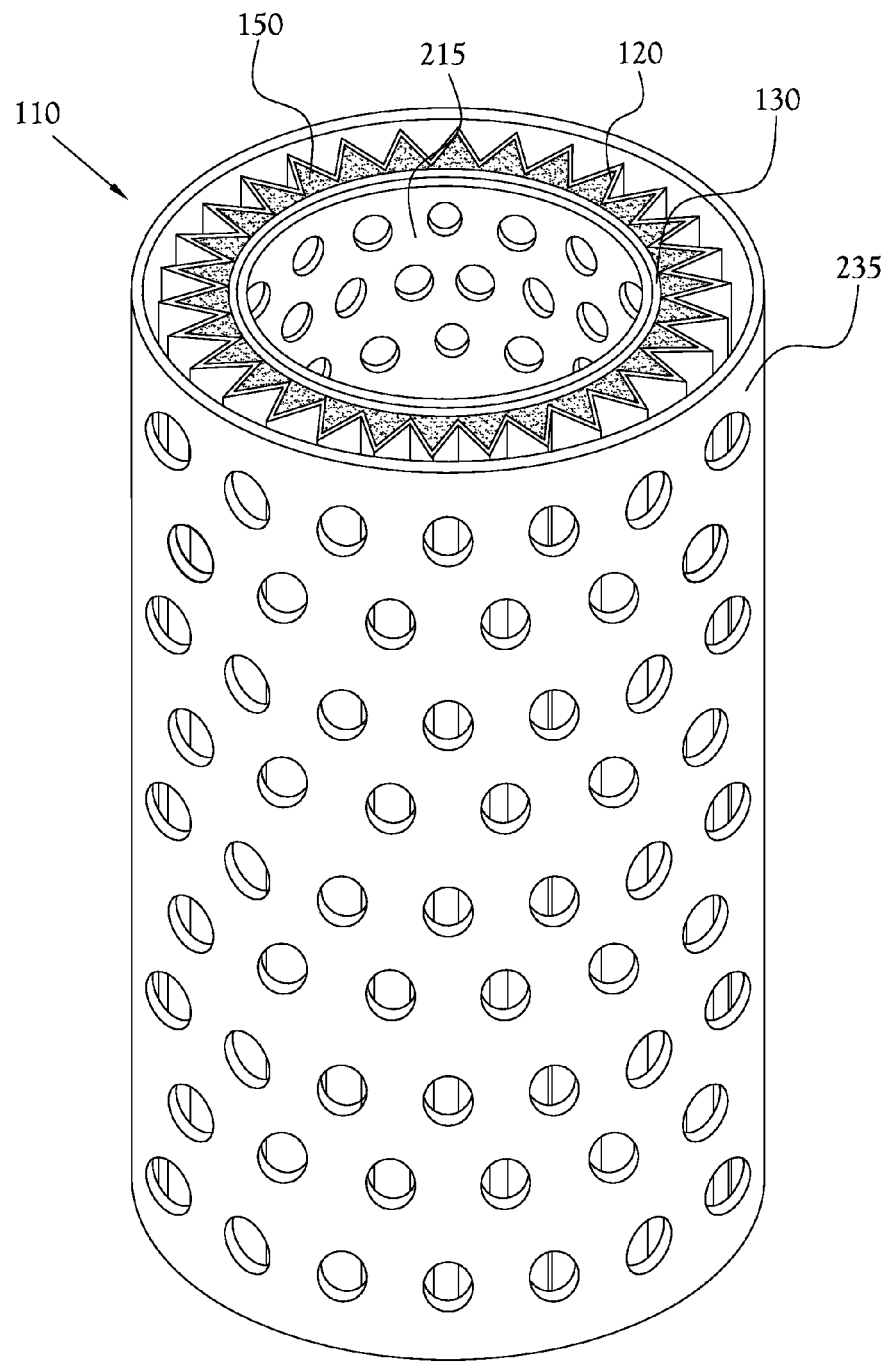
FIG. 1 is a perspective view of one example of a submersible media filter unit for separating radioactive isotopes from water.

Turning to the Figures, FIG. 1 illustrates one example embodiment of an SMF unit 110 according to the present general inventive concept. As shown in FIG. 1 and in the exploded view of the same example embodiment in FIG. 2, the illustrated SMF unit 110 includes an inner mesh screen 215 and an outer mesh screen 235. Between the inner mesh screen 215 and the outer mesh screen 235 are a pleated outer filter member 120 and a non-pleated inner filter member 130. The pleated outer filter member 120 and the non-pleated inner filter member 130 define an interstitial volume that is filled with media 150 to filter radioactive isotopes from water passed through the SMF unit 110.

Figure 2:
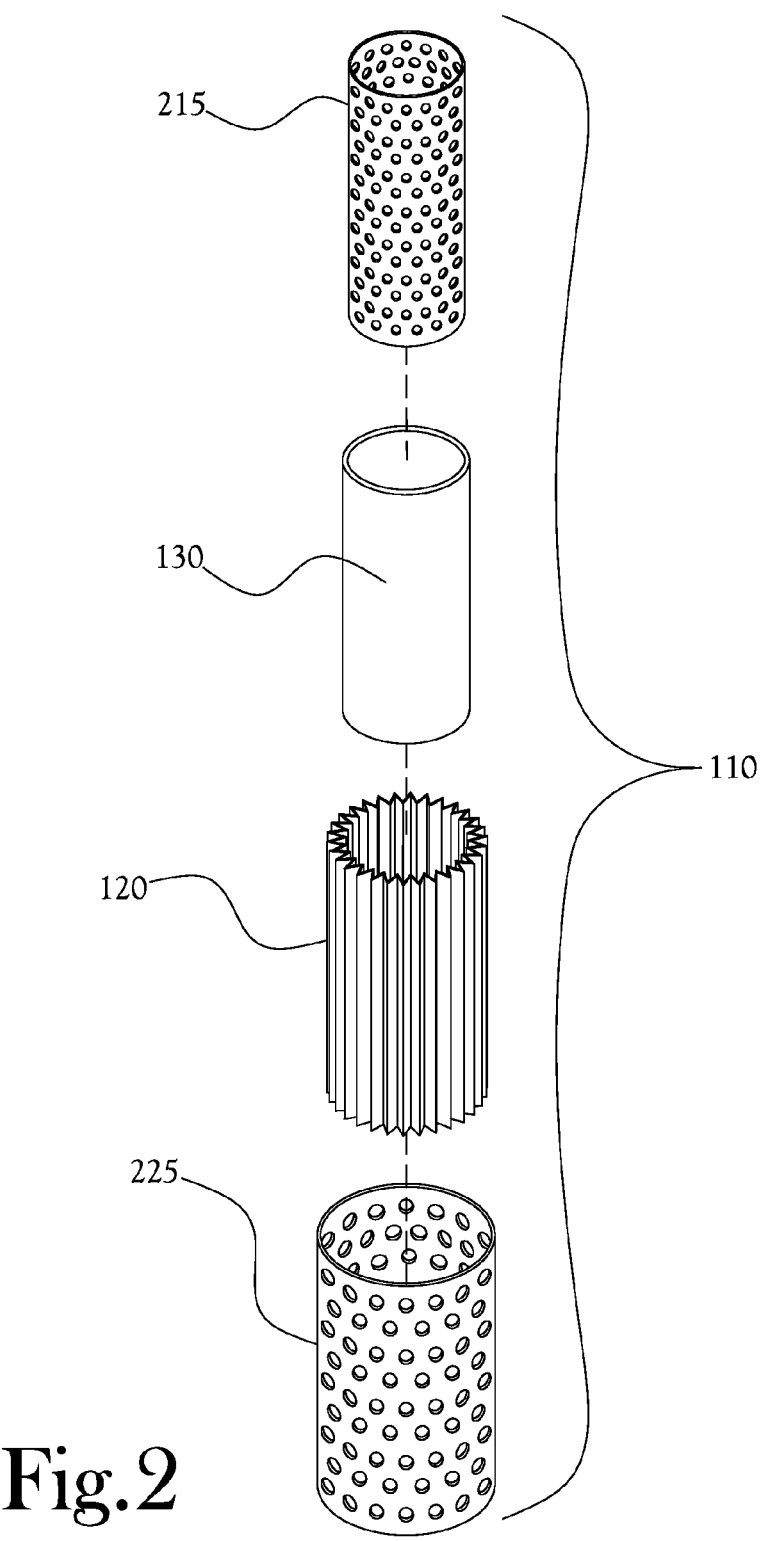
FIG. 2 is an exploded view of the example embodiment submersible media filter shown in FIG. 1.
Figure 3:
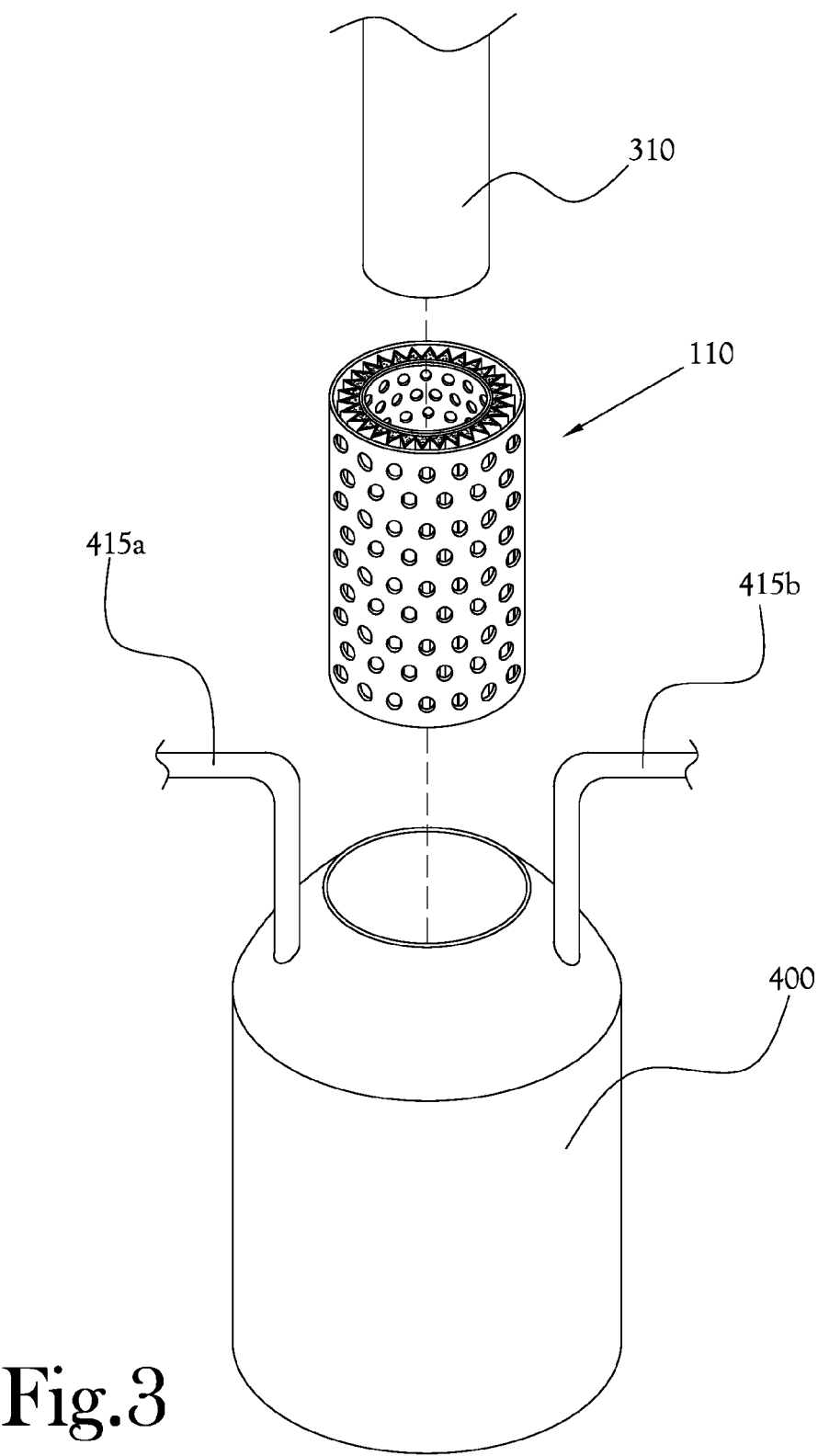
FIG. 3 is an exploded view of the example embodiment submersible media filter shown in FIGS. 1 and 2 used with a filtration vessel.

FIG. 3 is a partially exploded view illustrating one example embodiment of a system which uses an SMF unit like the one 110 illustrated in FIGS. 1 and 2. Generally, the SMF unit 110 sits within a filtration vessel 400. A water feed tube 310 delivers water containing radioactive isotopes to the filtration vessel 400, and outlet lines 415a and 415b carry water away from the filtration vessel 400. As shown in FIG. 3, the water feed tube 310 directs water containing radioactive isotopes into the interior of the SMF unit 110—that is, into the volume surrounded by the inner mesh screen 215 as shown in FIGS. 1 and 2. Pressure forces the water containing radioactive isotopes through the apertures in the inner mesh screen 215 and through the unpleated inner filter member 130. Once through the unpleated inner filter member 130, the water containing radioactive isotopes encounters the media 150 that fills the interstitial space between the pleated outer filter member 120 and the unpleated inner filter member 130. The media 150 remove selected radioactive isotopes from the water, and the water then passes through the pleated outer filter member 120 and apertures in the outer mesh screen 225 into a post-filtration surrounding volume within the filtration vessel 400. From there, the water passes the outlet lines 415a and 415b to leave the filtration vessel 400. The selected radioactive isotopes remain on the media 150 within the SMF unit 110.

Figure 4:
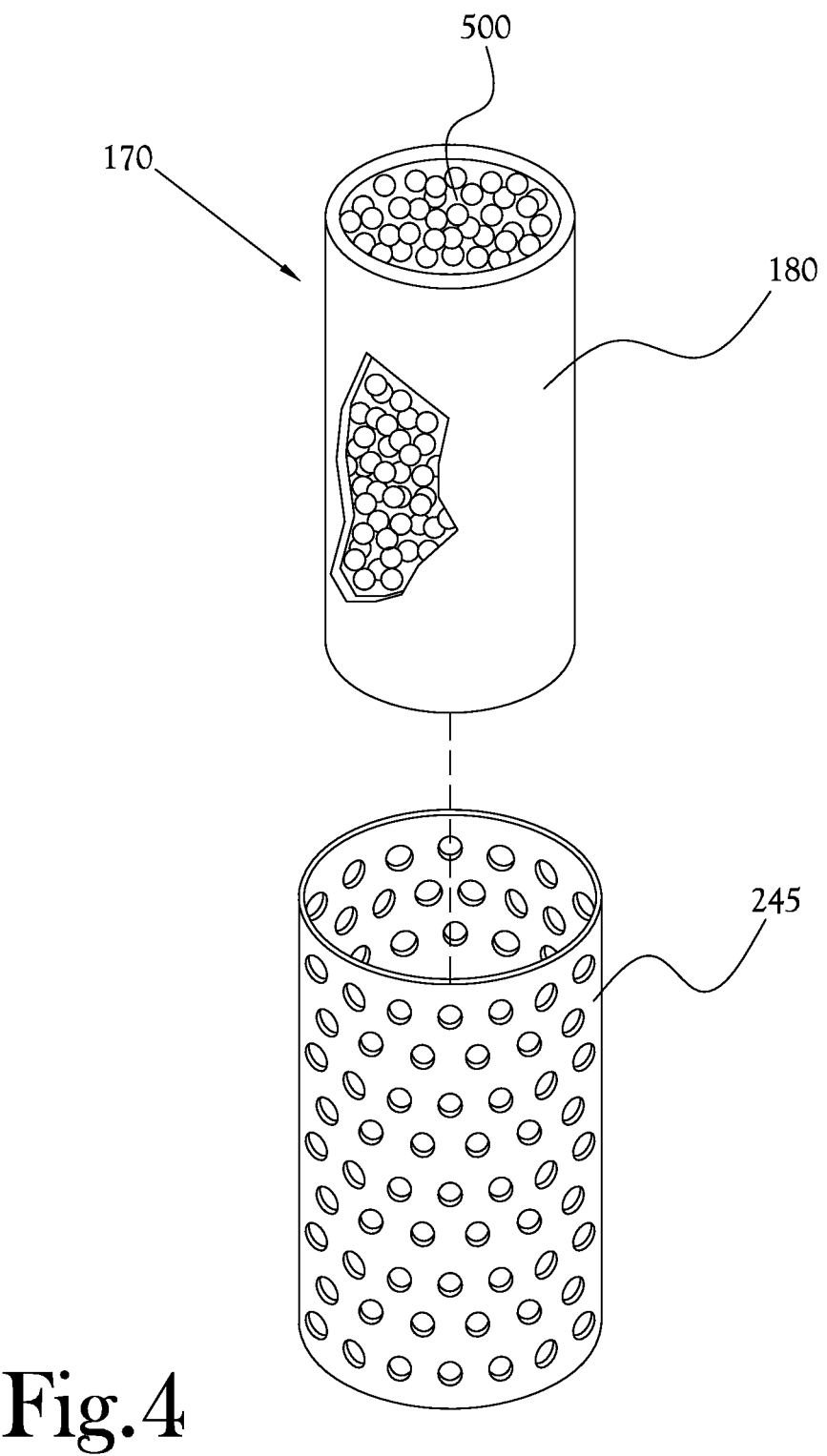
FIG. 4 is a view of an example embodiment of a submersible column according to the present general inventive concept.

In some embodiments of the present general inventive concept, a submersible filtration apparatus includes a submersible column (SC) 170 packed with media 500, as shown in FIG. 4. In the illustrated example embodiment, the SC 170 includes the media 500 to remove radioactive isotopes from water and a casing 180 to hold the media 500. Further, many embodiments surround the casing 180 with a protective component, such as a stainless steel mesh screen 245, as shown in the FIG. 4. In the illustrated example embodiment of a submersible column, water containing radioactive isotopes passes through the SC 170 from top to bottom (as opposed to passing from the interior to the perimeter, as in the SMF unit 110 illustrated in FIGS. 1-3), with the water containing radioactive isotopes passing through and interacting with the media 500 as it flows or trickles down the SC 170.

In several embodiments, the SC 170, including the media 500 and the casing 180, are designed to be vitrifiable after use. In most such cases, after disposing of the media 500 and the casing 180, the protective component, e.g., stainless steel mesh screen 245, is available for repeated use with a new SC.

Figure 5:
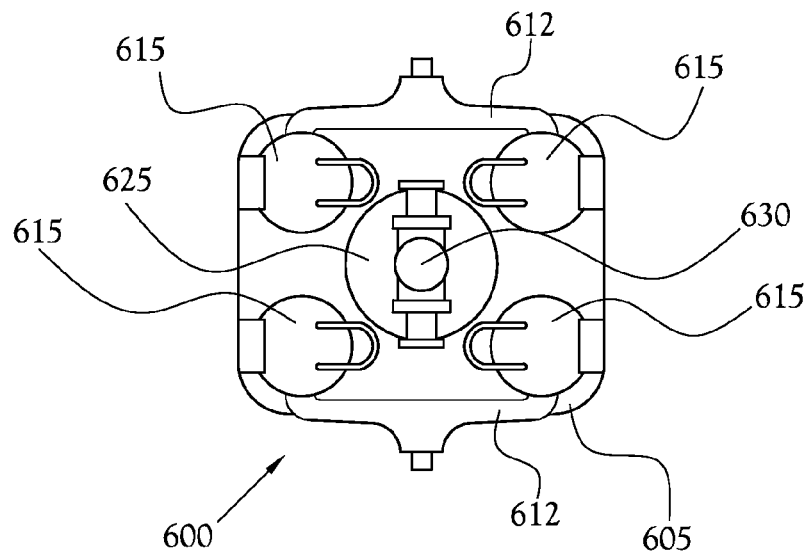
FIG. 5 is an overhead view of an underwater filtration/vacuum (UFV) apparatus with filter tubes to receive a submersible column or a submersible media filter according to an example embodiment of the present general inventive concept.
Figure 6:
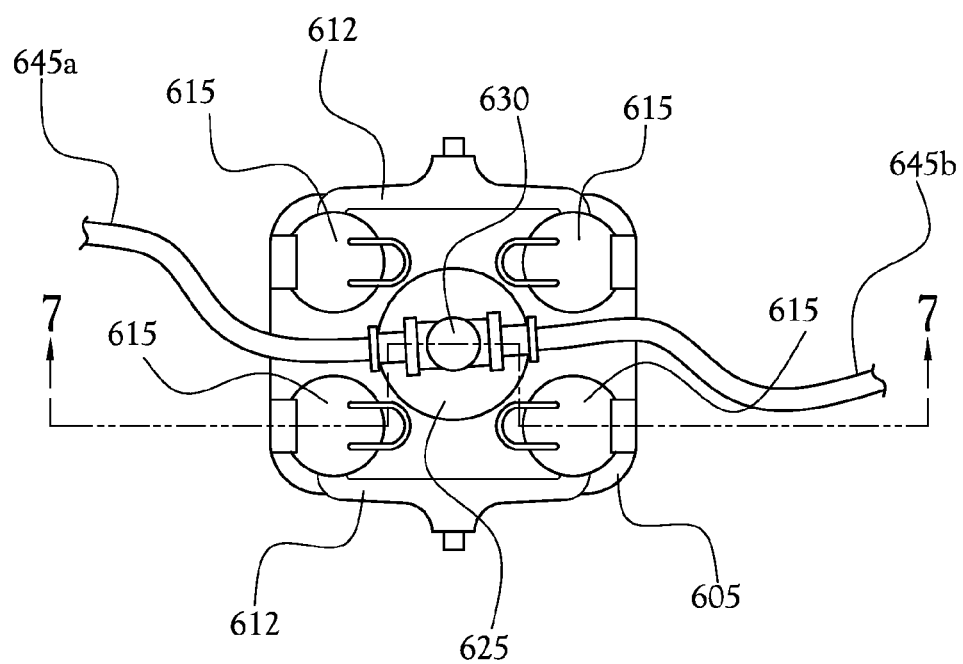
FIG. 6 is an overhead view of the UFV apparatus shown in FIG. 5, showing the section line along which the section view in FIG. 7 is taken.
Figure 7:
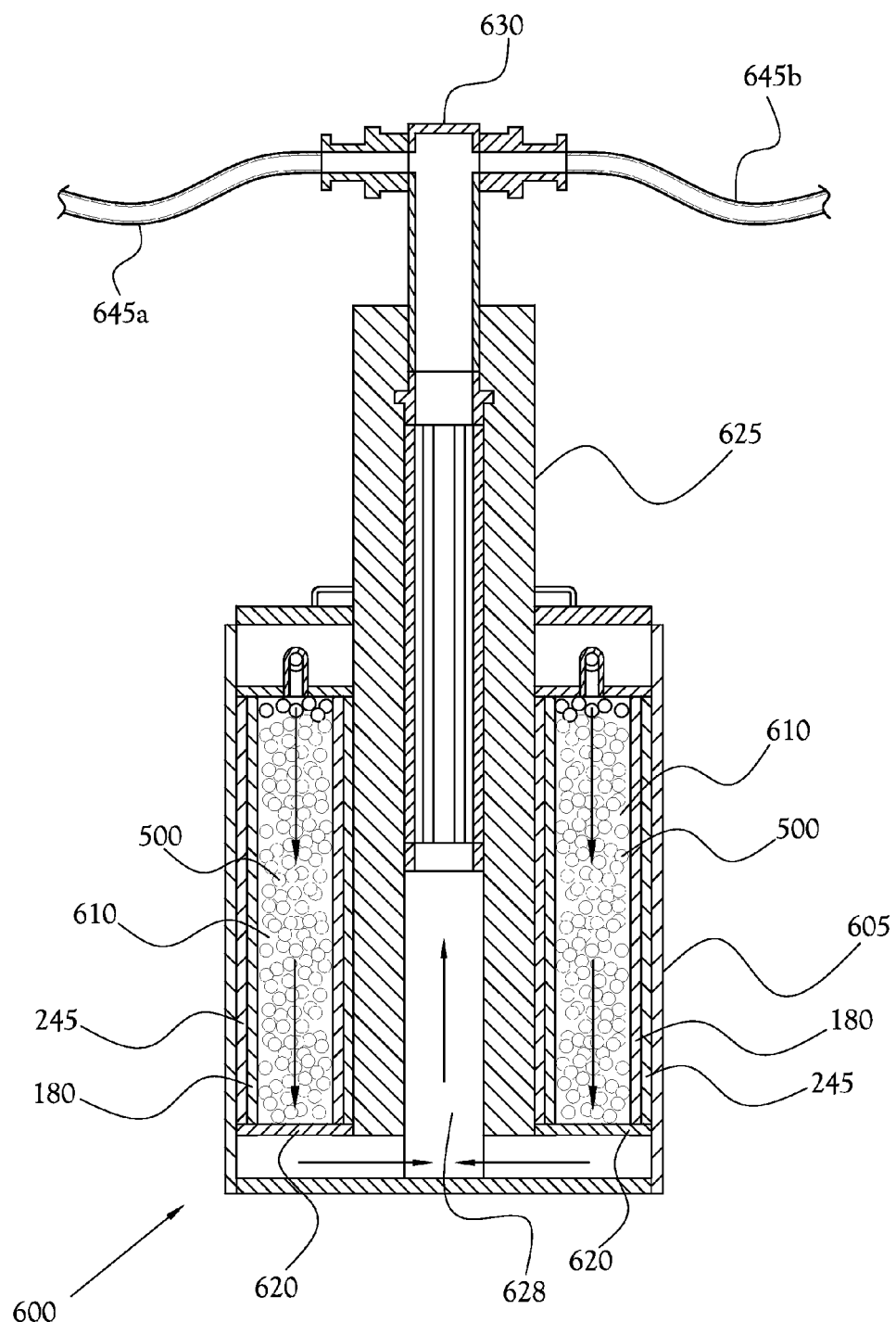
FIG. 7 is a section view of the UFV apparatus shown in FIGS. 5 and 6.

FIGS. 5, 6, and 7 illustrate one example embodiment of a system in which an SMF unit or SC according to the present general inventive concept works with an existing underwater filter/vacuum (UFV) apparatus or unit used in filtering water in a nuclear power plant; such existing UFV units known in the art include, for example, the UFV-600 model manufactured by Tri Nuclear Corp. FIGS. 5 and 6 show an overhead view of a UFV unit 600, with FIG. 6 showing the section line along which the section view illustrated in FIG. 7 is taken. As shown in the Figures, the illustrated example UFV unit 600 includes a housing 605 with four filter tubes 610 and a central pump tube 625. A filter tube cover or lid 615 covers each of the four filter tubes 610. Water is delivered to the tops of the filter tubes 610 through the input flow lines 612, which deliver water containing radioactive isotopes to the top of each filter tube. As shown in the section view in FIG. 7, in the illustrated embodiment, the shown filter tubes are occupied by SCs, and each SC includes a casing 180 packed with media 500 to filter radioactive isotopes from the water passed through the SC. Generally, water supplied by the input flow lines 612 passes down through the SCs in the filter tubes 610, as shown by the flow arrows in FIG. 7, with the media 500 filtering radioactive isotopes from the water as it passes through the media 500. When it reaches the bottom of the SC and the bottom of the filter tube 610, the water flows into the central column 628 of the housing 605 and thence is drawn upward through the central pump tube 625 to a top spigot 630, where the water leaves the UFV unit 600 through output lines 645a and 645b.

In some embodiments, a submersible filter according to the present general inventive concept comprises materials that assist in the vitrification process. In some embodiments, the submersible filter includes glass-forming materials.

In some embodiments, after the media within the SMF or SC have retained a pre-determined quantity of radioactive isotopes (or "target isotopes"), generally the target isotopes proceed to "extraction"—although, as used in this application, "extraction" of the target isotopes retained on the media within the SMF or SC encompasses a number of processes, not all of which necessarily involve the physical removal of the target isotopes from within the media. In some embodiments, the media are physically extracted from the SMF or SC. In some embodiments, the media are washed with a solvent that decouples the target isotopes from the media; the solvent with target isotopes is then collected and removed. As noted above, in some embodiments, the SMF or SC is physically extracted or removed from its vessel or filter tube within a fluid flow system, and then the SMF or SC (still containing the filter elements and ISM with target isotopes) is processed, often by vitrification.

In many example embodiments of the present general inventive concept, after the extraction step, the extracted material is subject to vitrification or comparable stabilization procedures. In several embodiments, the vitrification process includes processes and systems similar to some of the example embodiments described in U.S. patent application Ser. No. 12/985,862, by one of the same inventors as the present application and published on Sep. 15, 2011 as U.S. Patent Application Publication 2011/0224473. In some embodiments, a submersible filter according to the present general inventive concept comprises materials that assist in the vitrification process, such glass-forming materials.

A number of media and ISM materials are contemplated by the present invention. Many of the media used for ISM-based isotope separation include porous glass or porous glass-based materials. The nature of the ISM used in the column generally is dependent upon the isotope to be removed. In some embodiments, cesium-specific media include modified Herschelite ($(Na,Ca,K)AlSi_2O_6 \cdot 3H_2O$). In some embodiments, strontium-specific media include microspheres that include hydroxyapatite or granular titanosilicates. In some embodiments, media for the separation of technetium isotopes (i.e., technetium-specific media) include microspheres fabricated from modified Herschelite. In some embodiments, technetium-specific media include a surfactant-modified zeolite (SMZ), such as a zeolite in which some of the surface cations of the zeolite are replaced by a high-molecular-weight surfactant such as cetyltrimethylammonium bromide (CTMA), benzyldimethylsterylammonium chloride (BDMS), pentadecanoic acid (PDA), cetylpyridinium chloride (CPYR), or hexadecyltrimethylammonium. Other ISM for the separation from liquid wastes include media for the separation of nickel, cobalt, iron, antimony, iodine, selenium, americium, mercury, fluorine, plutonium, and uranium. ISM encompassed by the present invention include media for targeting isotopes including, but not limited to, Ni-63, Co-58, Co-60, Fe-55, Sb-125, I-129, Se-79, Am-241, and Pu-239. Other media used in some embodiments of the present invention include hydroxyapatite (generally "HA") ($Ca_5(PO_4)_3(OH)$) or a modified form of hydroxyapatite in which another anion substitutes for the hydroxide ion, such as fluoride ($Ca_5(PO_4)_3F$), chloride ($Ca_5(PO_4)_3Cl$), or carbonate ($Ca_{10}(PO_4)_6CO_3$). Other media used in some embodiments of the present invention include silver-impregnated zeolites. The media given here are examples and do not constitute an exhaustive list of materials used in ISM-based isotope-separation systems and processes.

In many embodiments of the present invention, the ISM column comprises ISM in the form of porous microspheres, especially glass-based microspheres (GMSs). Some embodiments of the process begin with glass beads fabricated from a mixture comprising sodium, calcium, and boron. The glass beads are mixed with a potassium phosphate solution (or similar phosphate solution) with basic pH; in many embodiments, the solution also includes potassium hydroxide or another hydroxide source. As sodium, calcium, and boron ions are released from the glass, beginning at the surface of the glass beads, phosphate and hydroxide ions react with calcium that remains on the beads to form a layer of amorphous calcium phosphate surrounding the unreacted glass core of the bead. As phosphate and hydroxide ions continue to act on the glass core, and the unreacted core shrinks and the layer of amorphous calcium phosphate grows. At the same time, the amorphous calcium phosphate furthest from the site of reaction on the glass core, in conjunction with hydroxide ions drawn from the solution, begins to stabilize into a hydroxyapatite (HA) layer. The HA layer continues to grow as the glass core continues to shrink and react to form amorphous calcium phosphate. The end result of this process is a porous microsphere substantially composed of HA.

While the present invention has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A submersible media filter to remove at least one of selected radioactive isotopes and selected ions from liquid waste materials comprising:

an inner filter member and an outer filter member, said outer filter member being pleated, having a pleated inside surface, and forming a cylindrical center opening, said inner filter member being at least one of a fiber or spun glass non-pleated material having a cylindrical shape and a cylindrical non-pleated outside surface configured to insert into the cylindrical center opening formed in the outer filter member forming separate interstitial spaces between inner pleats of the outer filter member with rounded convex inner surfaces formed by the outside surface of the inner filter member and oppositely declining surfaces extending down to the round convex inner surfaces formed by the inside surface of the outer filter member to hold media to remove the at least one of selected radioactive isotopes and selected ions from liquid waste materials passed through said media, wherein said media comprise at least one of a bead material and a granular material; and an inner mesh screen configured to insert into a cylindrical center opening formed in the inner filter member and including apertures to pass the liquid waste material into and through the inner filter member, media, and outer filter member and an outer mesh screen configured to extend outside of the outer filter member and including apertures for the liquid waste to exit after being filtered by the inner filter member, media, and outer filter members, said inner mesh screen and said outer mesh screen to hold said inner filter member said media, and said outer filter member between said inner mesh screen and said outer mesh screen.

2. The submersible media filter of claim 1 wherein said media include glass-based microspheres.

3. The submersible media filter of claim 1 wherein said media include at least one of Herschelite, modified Herschelite, and hydroxyapatite.

4. The submersible media filter of claim 1 wherein the inner filter and the outer filter comprise a fiber or spun glass material and the inner and outer mesh screen comprise a steel material.

5. The submersible media filter of claim 1 wherein said media include ion-specific media.

6. The submersible media filter of claim 1, wherein the inner filter and the outer filter comprise spun glass with an isotope-specific media.

7. The submersible media filter of claim 5 wherein said media include at least one of glass-based microspheres, Herschelite, modified Herschelite, hydroxyapatite, and titanosilicate media.

8. The submersible media filter of claim 5 further comprising glass-forming materials to assist in vitrification of said media.

9. A submersible media column to remove at least one of selected radioactive isotopes and selected ions from liquid waste materials comprising:
   a casing including a top end, a bottom end, and a side wall configured to hold a column of at least one of granular media and bead media to remove at least one of selected radioactive isotopes and selected ions from liquid waste materials passed through said media; and
   a protective mesh screen configured to extend over at least one of the top or bottom of the casing and the column of media, wherein the casing is configured to insert into a system including:
   an input flow line to deliver liquid waste materials containing the at least one of radioactive isotopes and ions into the top end and direct the liquid waste materials down onto a top portion of the granular media in an axial flow, through the column of granular media; and
   a central column to direct liquid exiting out the bottom end of the casing upward along a side of the central column.

10. The submersible media column of claim 9 wherein said media include ion-specific media.

11. The submersible column of claim 9 wherein said protective mesh screen includes stainless steel.

12. The submersible column of claim 9 wherein said media include at least one of glass-based microspheres, Herschelite, modified Herschelite, hydroxyapatite, and titanosilicate media.

13. The submersible column of claim 9 wherein said media and said casing are disposable.

14. The submersible column of claim 9 further comprising glass-forming materials to assist in vitrification of said media and said casing.

15. A submersible media column comprising:
   a casing including a top end, a bottom end, and a side wall configured to hold a column of at least one of granular media and bead media to remove at least one of selected radioactive isotopes and selected ions from liquid waste materials passed through said media; and
   a protective mesh screen configured to support the casing and the column of media, wherein the casing is configured to receive liquid waste materials containing the at least one of radioactive isotopes and ions through the top end and direct the liquid waste materials down onto a top portion of the granular media in an axial flow, through the column of granular media, and out through a bottom portion of the granular media and the bottom end of the casing,
   the submersible media column inserted into a system including:
   a housing including tubes to retain multiple ones of the submersible column;
   a central column to receive the water directed out through the bottom end of the casing of the submersible column; and
   a central pump tube to draw the water upward.

16. A submersible media filter to remove at least one of selected radioactive isotopes and selected ions from liquid waste materials comprising:
   an outer elongated pleated filter member having an inner surface, an outer surface, and forming a center opening;
   an elongated circular fiber or glass non-pleated inner filter member inserted into the center opening formed in the outer pleated filter member including an inner surface, and an outer surface abutting against inside corners of the inner surface of the pleated filter member to form interstitial spaces between the inner surface of the outer pleated filter member and the outer surface of the inner non-pleated filter member;
   at least one of a granular media and a bead-like media located in interstitial spaces formed between the inner surface of the outer pleated filter member and the outer surface of the inner non-pleated filter member to remove selected radioactive isotopes from liquid waste materials;
   an inner mesh screen configured to insert into a cylindrical center opening formed in the inner filter member and including apertures for directing the liquid waste materials into and through the sides of the inner filter member and the outer filter member; and
   an outer mesh screen configured to extend outside of the outer filter member and including apertures for directing the liquid waste materials out from the sides of the outer elongated pleated filter member.

17. The submersible media filter of claim 16 wherein the center opening in the outer pleated filter member and the inner non-pleated filter member each have an elongated cylindrical shape.

18. The submersible media filter of claim 1 wherein said media include at least one of titanosilicate media and any inorganic media.

19. The submersible column of claim 9 wherein said media include at least one of organic based resin.

20. The submersible column of claim 9 wherein the pleated filter member and the non-pleated filter member are a fiber or glass material and the inner and outer mesh screen are a steel material.

* * * * *